Sept. 5, 1967 W. S. ANDERSON 3,339,712
CONVEYOR BELT DODGED LINK CONSTRUCTION
Filed Oct. 20, 1965
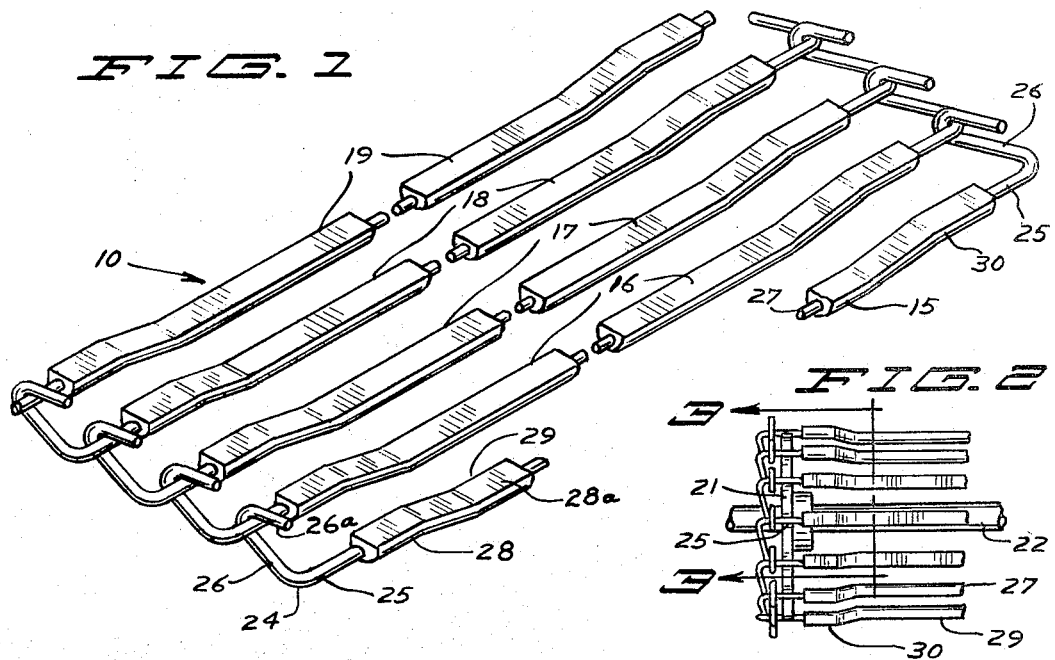
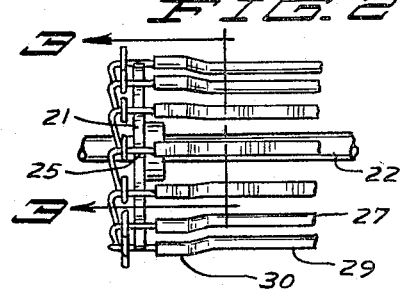
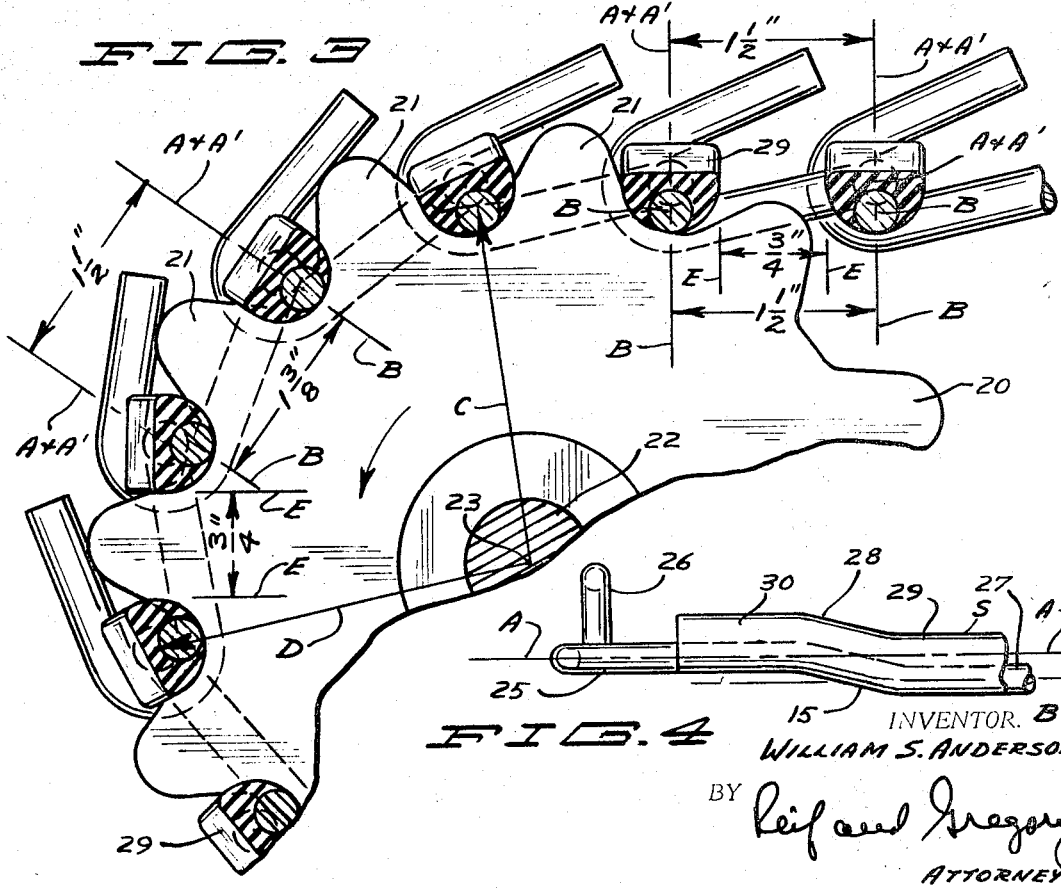
INVENTOR.
WILLIAM S. ANDERSON
BY
ATTORNEYS

# United States Patent Office 3,339,712
Patented Sept. 5, 1967

3,339,712
CONVEYOR BELT DODGED LINK
CONSTRUCTION
William S. Anderson, Braham, Minn., assignor to Braco,
Inc., Braham, Minn., a corporation of Minnesota
Filed Oct. 20, 1965, Ser. No. 498,321
1 Claim. (Cl. 198—195)

ABSTRACT OF THE DISCLOSURE

A dodged link conveyor structure having a resilient body of material overlying the dodged portion of each link, each of said bodies of material having a longitudinal axis which is coincidental with the aligned axes of the terminal portions of its respective link.

---

This invention relates to improvement in the link construction of an endless conveyor belt of the type having a surface for supporting goods. Reference is had to such a link construction having an offset or dodged central portion. The term dodged will be used herein to indicate a central downwardly offset portion of a link whereby a basket type of conveyor belt is formed. This type of conveyor is preferred because of its increased carrying capacity relative to a flat conveyor belt.

In a conventional type of such a conveyor belt as indicated, the spacing between the dodged portions of the links is reduced or narrowed as the links pass over a supporting sprocket wheel. The dodged portions of the links, in being downwardly disposed, in passing over a sprocket wheel define a smaller circle about the axis of the sprocket than the circle defined by the terminal portions of the links, which portions engage and are carried directly on the sprocket wheel. The sprocket teeth will be spaced to maintain the same spacing between the links at their terminal portions that is present in the upper or straight run of the belt, or in other words, to maintain what might be regarded as a normal spacing. The dodged portions however, in passing about a sprocket wheel incur a reduction in the spacing therebetween.

Particular reference is had to a conveyor belt, such as is used as a potato harvester. The goods moved are generally discharged at the end of the upper run of a belt as it passes over a sprocket wheel. Certain sizes of the potatoes tend to settle somewhat or nest somewhat between adjacent dodged portions of the links. As the spacing is reduced, even though such reduction may be relatively slight, said potatoes become pinched and bruised and some are nested sufficiently to become held and discharged onto the ground as the belt completes its passage about the sprocket wheel. In either case there results substantial crop damage. It is desirable therefore to provide a conveyor belt structure in which the dodged portion of the link structure is so arranged as not to have a reduction in the spacing between the dodged portions in passing over a sprocket wheel in comparison to the spacing present in a straight run.

It is an object of this invention therefore to provide a dodged endless conveyor belt structure wherein the links at their upper or supporting surface portions maintain a spacing between the links in passing over a sprocket wheel which is not less than the spacing present in a straight run of the belt.

It is another object of this invention to provide a dodged link construction for a conveyor belt such that the circle defined by the supporting surface of the dodged portions of the links in passing over a sprocket wheel has a radius not less than that of the circle defined by the terminal portions of the links that are engaged and supported directly by the sprocket wheel whereby there is maintained at least the same spacing between adjacent of the dodged portions of the links in passing over a sprocket wheel as is present in a straight run of the belt.

More specifically it is an object of this invention to provide a dodged link construction for a conveyor belt such that the links have upstanding therefrom supporting means whereby the supporting surface at the dodged portion of a link is either coplanar with the terminal portions of the link which directly engage and move over the sprocket wheels or is in a somewhat higher plane.

These and other objects and advantages of the invention will be set forth in the following description made in connection with the accompanying drawings in which like reference characters refer to similar parts throughout the several views and in which:

FIG. 1 is a broken view in perspective showing a representative portion of a conveyor belt structure with portions thereof being broken away;

FIG. 2 is a broken view in elevation on a reduced scale showing a representative portion of a conveyor belt structure in an operating position;

FIG. 3 is a broken view in vertical section taken on line 3—3 of FIG. 2 as indicated, with some portions being shown in dotted line; and FIG. 4 is a broken view in elevation showing a detail of construction on an enlarged scale.

Referring to the drawings, a representative portion of a conveyor belt 10 of the character herein indicated is shown comprising links 15–19. The links are all of identical structure. The link 15 will be described in detail. The other links will all have corresponding parts.

The link 15 comprises a rod substantially cylindrical in form and being indicated generally by the character 24 having a central dodged portion 27 and terminal portions 25 at either end thereof and with said terminal portions being in a plane elevated above that of said dodged portion and said terminal portions engage and ride over the supporting sprocket wheels, as will be described. Said dodged portion will be downwardly disposed substantially in a vertical plane.

Said terminal portions 25 have right-angled rearwardly disposed portions 26 having reversely curved end portions 26a forming hooks for the interengagement of successive of said links.

Embracing said rod 24 throughout a substantial portion of its length and upstanding or upwardly projecting therefrom is a somewhat resilient body member indicated generally by the character 28. Said member 28 is preferably formed of a rubber material having sufficient resilience not to bruise a root crop carried thereon but having sufficient rigidity to retain its form. Said body member is formed onto said rod 24 by a conventional molding process. This forms no part of the invention herein. Said member 28 comprises a dodged portion 29 corresponding in length to the dodged rod portion 27. Said member 28 extends at either end beyond said dodged portion 27 but stops short of the terminal portions 25 to permit said terminal portions to remain bare for direct engagement with the supporting sprocket wheels over which said belt passes.

The body member 28 is particularly formed as will now be described and its particular form relates to the essential novelty of the invention herein.

With reference to FIG. 4, the line or point A represents the axis or center line of the terminal rod portions 25, said terminal rod portions having a common axis or center line. The line or point B represents the axis or center line of the dodged rod portions 27.

The member 28 is molded about the rod 24 in such a manner as to be eccentric thereto and have an upper or top portion upstanding therefrom. The member 28 in cross section defines a circle at its dodged portion having a center A', or in other words, if the dodged portion of the member 28 were shown as a full cylinder, its center line or axis would be the line indicated by the character A'.

The center line A' is above the center line B of the dodged rod portion 27 and is coincidental with or in axial alignment with the centers or center line A of the terminal portions.

To provide a preferred supporting surface, said member 28 has a substantially flat top or upper surface 28a. Said surface represents a chord of the circle defined by a cross section of said member 28. Said surface 28a in FIG. 4 is indicated as being in the horizontal plane S, which plane is above the plane of the center line A'. It will be understood that the surface 28 must be in a plane at least coplanar with the center line A or may be elevated thereabove to avoid a reduction in the spacing between adjacent or successive of said surfaces in passing over a sprocket wheel.

With reference to FIG. 3, a sprocket wheel 20 is indicated having peripheral teeth 21, with said sprocket wheel being supported in a conventional manner on a shaft 22 and rotating about its axis 23.

OPERATION

The conveyor belt 10 will be mounted for operation in a conventional manner. Only a sufficient amount of said belt is shown in operating position as is deemed necessary to describe the invention disclosed herein. Particular reference is had to FIGS. 3 and 4. In FIG. 3, the movement of the belt is towards the left as viewed as indicated by the arrow.

It will be assumed that the portion shown of the conveyor belt 10 has just completed the top run and is passing over the sprocket wheel 20. It will be understood that for purpose of description only one sprocket wheel is shown and that in actual operation there will be spaced pairs of sprocket wheels at either end of the belt to support and drive the same.

To simplify the description of the operation, individual link designations such as 15–19 have been omitted from FIG. 3. The centers A, A' and B and the plane S relate more specifically to the operation in pointing out the novelty here disclosed.

It is believed obvious that as the belt 10 passes over the sprocket wheel that the dodged rod portions 27 will define a smaller circle with respect to the center 23 of the sprocket wheel than will the terminal rod portions 25. The sprocket teeth will be spaced to maintain said portions 25 the same distance apart or spaced the same in passing over the sprocket wheel as in moving through the upper or straight run of the belt.

The radius D represents the distance from the centers A of the terminal portions 25 to the center line or axis of the sprocket wheel 23. The radius C represents the distance from the center line B of the dodged portion 27 to said center 23. Radius C is shorter than radius D.

In a straight run of the belt as in its upper run, the distance between successive centers B and the distance between successive centers A will be the same. In the illustration in FIG. 3, this distance is shown to be 1½ inches. However in passing about the sprocket wheel, in view of having a shorter radius, the distance between the successive centers B will be reduced as shown here to 1⅜ inches whereas the space between the successive centers A remains the same. The illustration is drawn accurately to scale. It will be appreciated that the reduction in spacing will be substantially greater in the full scale of the belt and sprocket wheel in a size such as would be commonly used.

The dodged portion 29 of the member 28 is arranged for purposes of illustration here to have its upper surface 28a elevated above the place of its center line A' as indicated by the plane S in FIG. 4. The center line A' of said dodged portion is coincidental with the center lines or axes A of said terminal end portions. Thus the spacing betwqeen the center lines A' of successive portion 29 will remain unchanged in passing about the sprocket wheel and will remain the same as it is in a straight run and the spacing between adjacent surfaces 28a will not be reduced.

The lines E—E indicate that there is no reduction in spacing between the adjacent dodged portions 29 as the belt passes over the sprocket wheel.

Thus it is seen that I have provided a simple and expedient structure to improve a dodged type of conveyor belt to overcome a reduction in spacing between adjacent of the supporting surfaces of the links in the passage of the belt over a sprocket wheel.

It will of course be understood that various changes may be made in the form, details, arrangement and proportions of the parts without departing from the scope of applicant's invention which, generally stated, consists in a device capable of carrying out the objects above set forth, in the parts and combinations of parts disclosed and defined in the appended claim.

What is claimed is:

A conveyor belt construction having in combination,
an endless belt comprising a plurality of links,
means interengaging said links,
pairs of axially spaced sprocket wheels having said belt pass thereover,
said sprocket wheels each having uniformly spaced teeth thereabout,
each link comprising an elongated rod having a central dodged portion downwardly disposed with respect to the terminal portions of said rod,
said terminal portions of said rod having axially aligned centers and being received between said teeth of said sprocket wheels for equal spacing between said terminal portions of adjacent of said links in passing over said sprocket wheels,
a member comprising a body of material embracing said dodged portion of each link and extending upwardly of said dodged portion and substantially defining a circle in cross section having a center in axial alignment with the aligned centers of the terminal portions of each link,
the upper surface of said body of material forming a chord of said defined circle overlying said center thereof whereby
said body of material of each of said links of said endless belt has its axis moving in alignment with the aligned axes of the terminal portions of the respective links to maintain equal spacing between adjacent axes of said bodies of material in passing over said sprocket wheels.

References Cited
UNITED STATES PATENTS

| | | | |
|---|---|---|---|
| 2,149,776 | 3/1939 | Knoerzer | 198—195 |
| 2,369,723 | 2/1945 | Denlinger | 198—195 |
| 3,253,699 | 5/1966 | Schneider | 198—195 |

EVON C. BLUNK, *Primary Examiner.*

RICHARD E. AEGERTER, *Examiner.*

A. C. HODGSON, *Assistant Examiner.*